Jan. 20, 1953 G. E. LAMB 2,626,040
VERTICAL CONVEYER
Original Filed Oct. 11, 1943 3 Sheets-Sheet 1

INVENTOR
GEORGE E. LAMB
BY
Cook + Robinson
ATTORNEYS

Jan. 20, 1953 G. E. LAMB 2,626,040
VERTICAL CONVEYER
Original Filed Oct. 11, 1943 3 Sheets-Sheet 2
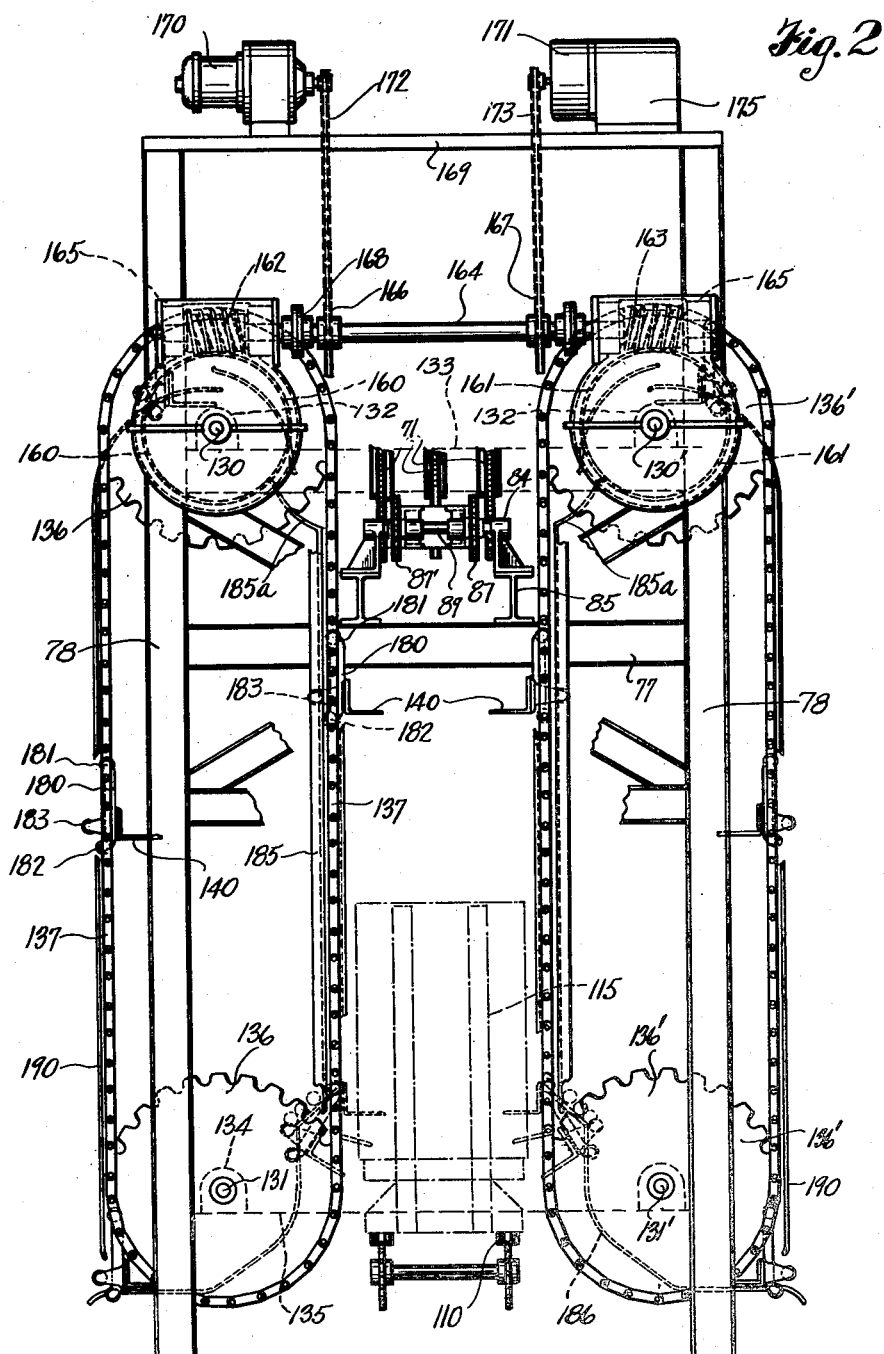
Fig. 2
INVENTOR
GEORGE E. LAMB
BY 
ATTORNEYS

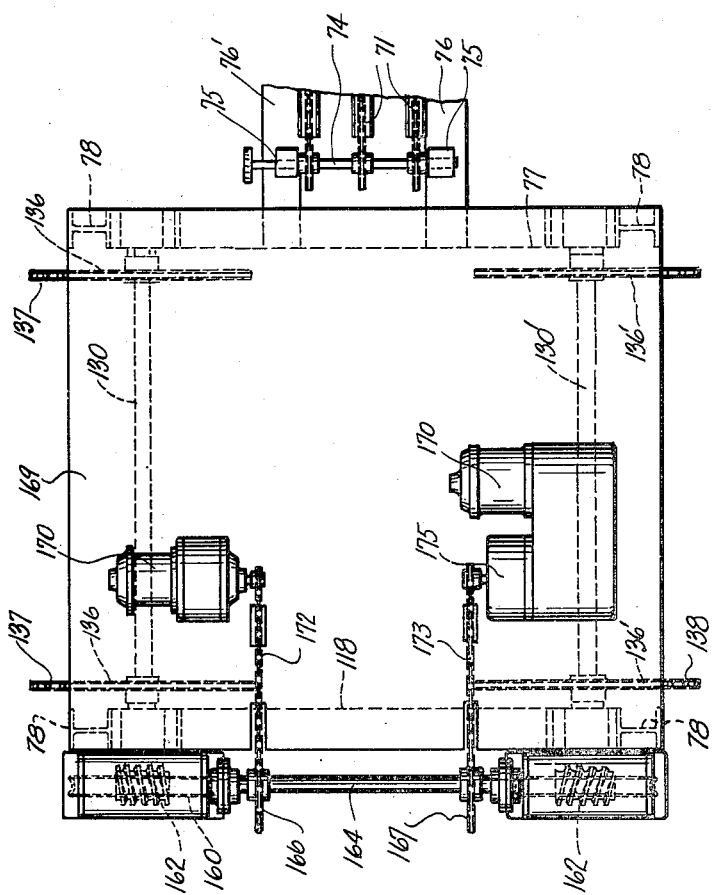

Patented Jan. 20, 1953

2,626,040

UNITED STATES PATENT OFFICE 2,626,040

VERTICAL CONVEYER

George E. Lamb, Hoquiam, Wash.

Original application October 11, 1943, Serial No. 505,777. Divided and this application December 11, 1946, Serial No. 715,446

2 Claims. (Cl. 198—163)

This invention relates to improvements in machines used for the assembling, stacking and loading of wood blocks and slabs, and whereby wooden blocks or slabs of uniform length may be quickly assembled in stacks of definite dimensions and deposited in skips or trucks for the conveyance of the stacks from the machine to points of use.

The present invention is a divisional part of my copending application for patent which was filed on October 11, 1943, under Serial No. 505,777, Patent No. 2,413,979.

Fig. 2 is an end view of the same.

Fig. 3 is a top view of the mechanism.

Figure 1:
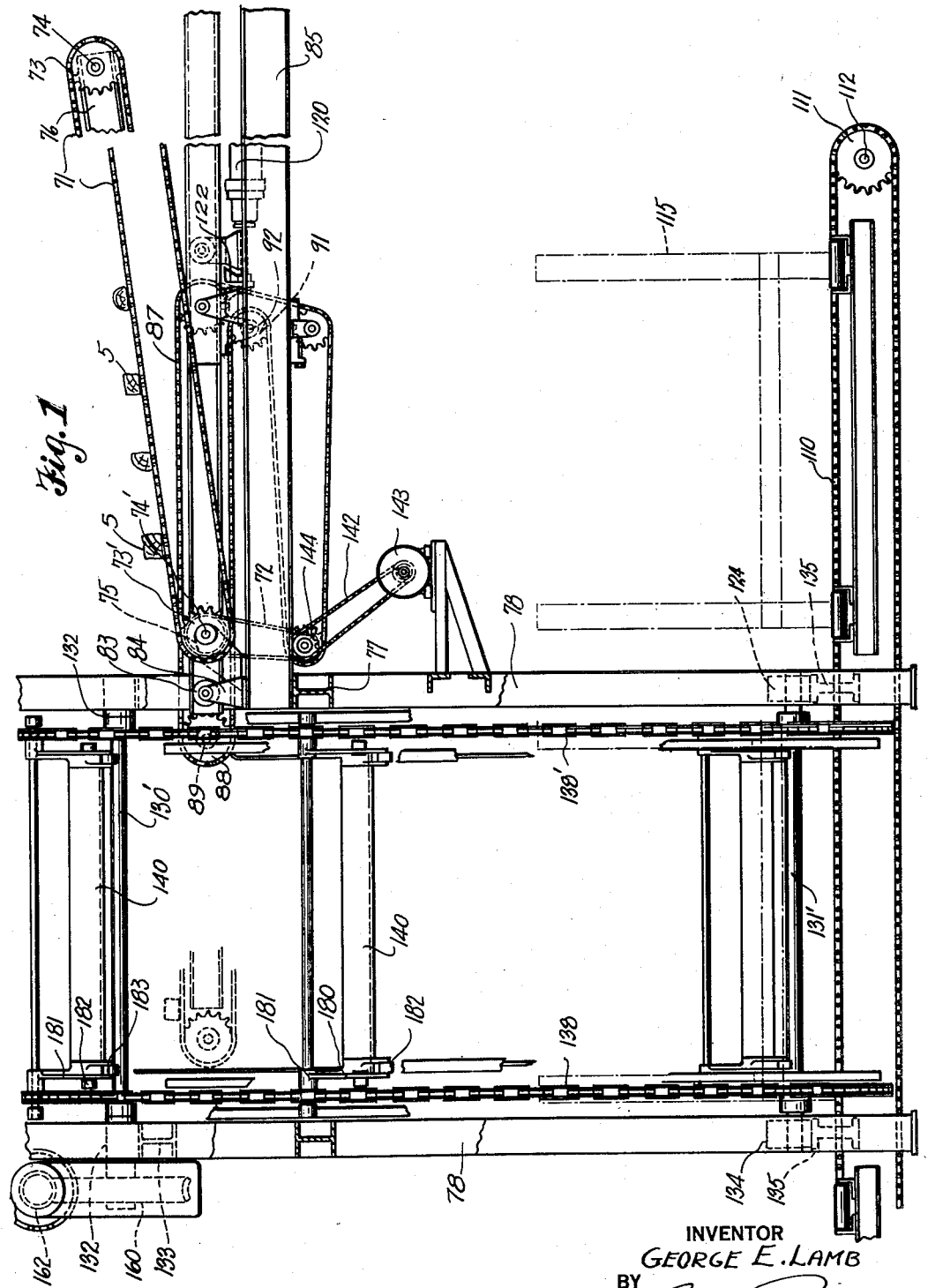
Fig. 1 is a side elevation of the present vertical conveyor mechanism, showing its feed conveyors.

The device embodied by the present invention is adapted to be used in connection with mechanism which operates to arrange wood blocks and slabs, received in promiscuous order, transversely upon a conveyor belt in parallel arrangement and with ends aligned. From this conveyor belt, the blocks are delivered to a relatively slow moving belt which receives and operates to closely condense or assemble the prearranged blocks for delivery onto a shuttle conveyor mechanism for deposit thereby in successive layers in a downwardly moving load forming rack, thus to progressively build up a stack of definite dimensions. The stacks, when of a predetermined height, are deposited by the loading mechanism onto conveyor trucks or skips, and with the complete loading of each skip, it is caused to be moved from the machine and an empty skip brought automatically into position for reception of the next load.

Referring more in detail to the drawings—

In Fig. 1 the present vertical conveyor mechanism is illustrated at the left hand side of the view and it is shown to include a frame structure, of the rectangular form shown in plan view in Fig. 3, and comprising the four corner posts 79 rigidly joined at their upper ends by the platform 169. To deliver the blocks to the vertical conveyor, I provide the downwardly inclined slow moving conveyor comprising a plurality of belts 71. The belts 71 operate at their opposite ends about sprocket wheels 73 and 73' mounted in cross-shafts 74 and 74' supported in a frame structure designated in part at 76 in Fig. 1.

From the belts 71 the blocks of wood, designated by numeral 5 in Fig. 1, are discharged into a horizontally reciprocating shuttle mechanism. This comprises a pair of parallel, horizontally traveling belts 87—87' that operate at the discharge end of the shuttle mechanism over sprocket wheels 88 on a supporting shaft 89. The shuttle conveyor reciprocates between the full line position in Fig. 1 and the dotted line position and thus operates to discharge the blocks in layers across the stack of blocks as it is built up. Any suitable means may be employed for actuating the shuttle and since it forms no part of this invention, it will not be described in detail.

The shuttle belt mechanism is supported by a horizontal frame structure comprising horizontal beams 85 which rest upon a cross beam 77 fixed to and extending between posts 79 of the main frame structure as seen in Fig. 2.

Before going into detail with respect to the construction and mode of operation of the block stacking and loading devices, it will be explained in brief, that the empty skips for reception of the loads are first brought to a position beneath the shuttle conveyor structure, for advancement, as needed, by an intermittently moving belt conveyor, indicated at 110, to the loading position within the lower end of the vertical frame structure of the vertical conveyor mechanism. Then, upon receiving their loads, the skips are moved by the conveyor 110 to a position for lateral discharge onto a roller conveyor whereby they may be taken to a point of use.

The conveyor 110 comprises two parallel chain belts that operate, at their opposite ends about sprockets 111 on cross shafts 112 and 113, shown in Fig. 1, and the drive of the conveyor is through a connection with one or the other of these shafts.

A skip of preferred type is designated at 115. It comprises a horizontal bottom structure with four vertical corner posts; the width being somewhat less than the length of the blocks to be loaded thereon. After a skip has been disposed on the conveyor 110, a controlled advance movement of the belt first locates the skip in proper position for loading, then, after it is loaded, moves to position for discharge from the conveyor.

The vertical frame extends somewhat above the delivery end of conveyor 71 and the horizontal line of travel of the shuttle carriage. Thus, in its reciprocal action, the shuttle conveyor moves into and from this frame as is indicated in Fig. 1.

The reciprocal actions of the shuttle carriage are effected by a controlled application of pressure medium to the cylinder of a hydraulic jack 120 that is fixedly mounted in the supporting structure 85 for the shuttle carriage as noted in Fig. 1. The jack piston rod 121 is connected at its outer end to a bracket 122 depending from the carriage.

Mounted in the upper portion of the frame structure of the mechanism is a pair of horizontal, spaced cross shafts 130 and 130', and likewise, in the lower portion of the frame are paired, horizontal cross shafts 131 and 131'. The upper shafts are revoluble in bearings 132 fixed on horizontal frame members 133 and the lower shafts likewise are revoluble in bearings 134 on horizontal frame members 135. The upper shafts are aligned vertically with corresponding lower shafts in planes that are parallel with and at opposite sides of the path of travel of the shuttle conveyor. Fixed on each of the shafts 130 and 131 are two rather large sprocket wheels 136 about which vertically operating chain belts 137 and 137' extend. Likewise, fixed on the shafts 130' and 131' are two spaced sprocket wheels 136' about which sprocket chain belts 138 and 138' operate.

The adjacent or inside runs of these two sets of belts, at opposite sides of the line of travel of the shuttle, are spaced apart a distance that is somewhat more than the lengths of the blocks that are to be stacked, and supported by and extending between paired belts, are horizontally disposed, angle bars 140 so arranged on the coacting pairs of belts as to serve as supports for the opposite ends of blocks in the building up of stacks of blocks between the belts. The mounting of the angle bars is later described.

In the operation of this mechanism, the two pairs of chain belts which mount the angle bars 140, are driven in unison and in such direction that corresponding bars 140 of the two sets of paired belts will be brought simultaneously into position at opposite sides of the shuttle conveyor to receive and support a layer of blocks thereon, as in Figs. 10 and 11, then in accordance with the building up of the stack of wood by the controlled action of the shuttle conveyor, as presently described, the belts are caused to travel downwardly, thus to maintain the top of the stack at a level that is best suited for receiving the blocks from the shuttle conveyor.

The shuttle conveyor belts are driven at the same speed and in the direction of the chains of their shuttle feed conveyor by a driving belt connection, indicated at 142, with an electric motor 143; the belt operating over a sprocket wheel 144 on cross shaft 94.

The operation of the shuttle conveyor and control of the loading chain belts for the building up of a load is as follows:

Successive operations of filling the shuttle, extending and then retracting it while unloading therefrom will cause successive layers of blocks to be laid onto the load, the top of which is kept at proper level to receive the blocks, by reason of a controlled rate of lowering of the loader chain belts.

In the building up of a load in this way, it is formed to an exact length by reason of the stack being built up and lowered between opposite end boards 150 and 151, shown in part in Fig. 1, that are fixed in the frame structure 79 in positions with which the end posts of the skips will be aligned to receive the load.

The means for driving and controlling the action of the loader chain belts which carry the angle bars 40, is shown best in Figs. 2 and 3 and comprises the following devices:

Fixed on the outer ends of the shafts 130 and 131, are driving worm gears 160 and 161, and meshing with these gears, respectively, are worms 162 and 163 on a driven cross-shaft 164 that is revolubly mounted in supporting bearings 165 carried by housings 166 that enclose the worm gears. Mounted on the shaft 164 are sprocket wheels 166 and 167; the gear 166 being operatively connected with the shaft through an over running clutch device 168, while gear 167 is fixed directly thereto.

Mounted upon the cross beams 118 of the frame 79 is a plate 169 on which electric motors 170 and 171 are mounted. These motors have their driving shafts operatively connected, respectively, with the sprocket wheels 166 and 167, by chain belts 172 and 173. A feature of the driving of the loading belts is that the motor 171 operates through a variable speed driving means, indicated at 175, whereby the rate of travel of the loading chains may be regulated to best suit the normal delivery of wood being handled at any particular operation, while the motor 170 has a high speed connection, and this motor is thrown into operation at the time of changing from one set of carriers to another for a quick lowering of a finished load, or it may be thrown into operation at any time when a faster lowering of the carriers is desirable, such, for example, to take care of any sudden run of large blocks of wood which may come on suddenly and be of too short durations to make readjustment of the other motor practical.

Assuming that a load has been built up by the successive operations of filling and unloading the shuttle conveyor, as previously described, the load may then be lowered quickly, through the predetermined interval, by transferring the driving power from the motor 171 of normal speed to the high speed motor 170, thus by quick travel to locate the lower end of the finished load in entering position between the upper ends of the stakes of the waiting skip, which is brought into position with the start of the downward travel. This quick lowering of a finished load provides a desired spacing between successive loads, which is required in order that a loaded skip may be moved from loading position and an empty skip be brought into loading position without requiring that the down travel of the loading belts be stopped. After a filled skip has been removed and a finished load has thus been lowered, the loading belts may, by shifting of the driving connection from the high speed motor back to the normal speed motor, be caused to assume the normal rate of downward travel while another load is being built up and the finished load lowered and deposited in the receiving skip.

The releasing of the finished load is effected by means as follows: Referring again to Fig. 2, it is to be observed that the horizontal angle bars 140, suspended from the paired loading belts for supporting the loads during their formation, are each suspended from the corresponding paired belts at the insides thereof by means of two hanger brackets 180. These brackets are pivotally fixed at their upper ends, as at 181, to links in the corresponding belts to permit a necessary oscillating action of the bars. At their lower or swinging ends, the brackets are each equipped with two laterally offset guide rollers 182 and 183. As the bars are brought to load receiving position, the rollers 182 come into rolling contact with the inside surfaces of vertical guide rails 185 that are fixedly supported in the loading structure. While the load supporting bars 140 are moving downwardly through that certain extent of travel during which a load is being built up, lowered and deposited, the bracket guide rollers 182 engage these rails and the paired bars 140 are thereby held in an exact spacing for the support of a load thereon. As the load is finally lowered into the receiving skip, the outer guide rollers pass from the lower ends of the rails 185 and the other sets of guide rollers 183 move into contact with the outside surfaces of outwardly directed guide rails 186, which, incident to a continued downward travel of the belts, causes the brackets to be swung outwardly, and the bars 140 caused to be freed from the load and the latter deposited upon the bottom of the skip.

With the load thus deposited, the hanger brackets continue to ride outwardly on the guide rails 186 until their pivot points have passed to the outside of the lower belt carrying sprockets and started upward, at which time the guide rollers 183 will move into guiding contact with vertical guide rails 190 which extend upwardly to the level of and are then curved inwardly to extend across the supporting shaft for the upper belt mounting sprockets. This causes the bars 140 to be brought again into proper position of suspension from their respective chains whereby, as the belts continue to carry the brackets across the top of the supporting sprockets and downwardly, the rollers 182 contact with inwardly inclined upper end portions 185a of the rails 185 and the bars 140 are again brought into position for reception of a load, as deposited thereon by the unloading action of the shuttle conveyor.

In the present instance, I have shown each of the paired loaded belts as being equipped with five of the load supporting bars 140. However, this may be changed to suit conditions or dimensions as required.

After a load has been deposited in a skip, the conveyor belt 110, on which it is supported, may be caused to move through a pre-determined distance of travel whereby to locate the loaded skip in position for lateral discharge therefrom and to bring the waiting empty skip into position for reception of the next load. In this instance, I prefer to use roller conveyors for bringing the skips into position and for discharging them from the intermittent belt, and it is preferred also that sections of these roller conveyors be mounted to permit certain tilting so that the travel of the skips to and from the intermittent belt will be effected by gravity.

Having thus described my invention what I claim as new therein and desire to secure by Letters Patent is:

1. In a machine of the character described, two continuous, driven belts, each comprising a pair of laterally spaced chains mounted for travel in unison about upper and lower sets of sprocket wheels and providing inner and outer vertically traveling runs; the inner runs of the two belts moving downwardly in unison, and being spaced apart for the reception of articles between them, horizontal angle bars extended between the chains of each belt, hangers pivoted on the belts and suspending the said bars from the chains in positions to co-act for the reception and support of loads of material thereon, cam followers on the hangers, cam rails fixed in position along the inner runs of the chains for contact by the cam followers as the bars move downwardly to maintain an exact spacing of co-acting load supporting bars, and for causing the hangers to be swung away from each other at the lower end of the run to move the bars apart for the release of a load supported thereby.

2. A device as in claim 1 including cam rails with which the cam followers are caused to contact to swing the hangers back to suspended position as the bars are moved upwardly and to retain that position while carried across the upper sprocket wheels and into guiding contact with the first mentioned cam rails.

GEORGE E. LAMB.

REFERENCES CITED

The following references are of record in the file of this patent:

UNITED STATES PATENTS

| Number | Name | Date |
|---|---|---|
| 236,815 | Holmes | Jan. 18, 1881 |
| 835,312 | McNabb | Nov. 6, 1906 |
| 1,128,671 | Evans | Feb. 16, 1915 |
| 1,325,857 | Olson | Dec. 23, 1919 |
| 1,343,799 | Trefren | June 15, 1920 |
| 1,705,570 | Horstkotte | Mar. 19, 1929 |
| 1,825,950 | Hall | Oct. 6, 1931 |
| 1,969,122 | Witt | Aug. 7, 1934 |
| 2,065,674 | Fay, Jr. | Dec. 29, 1936 |
| 2,477,830 | Sandberg | Aug. 2, 1949 |

FOREIGN PATENTS

| Number | Country | Date |
|---|---|---|
| 627,608 | Germany | Mar. 19, 1936 |